(12) United States Patent
Liu et al.

(10) Patent No.: US 11,321,182 B2
(45) Date of Patent: May 3, 2022

(54) DATA BACKUP METHOD, A DATA BACKUP DEVICE, AND A COMPUTER PROGRAM PRODUCT

(71) Applicant: EMC IP Holding Company LLC, Hopkinton, MA (US)

(72) Inventors: Weiyang Liu, Shanghai (CN); Mengze Liao, Shanghai (CN); Qi Wang, Shanghai (CN); Ren Wang, Shanghai (CN); Ming Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 16/804,188

(22) Filed: Feb. 28, 2020

(65) Prior Publication Data

US 2021/0117282 A1    Apr. 22, 2021

(30) Foreign Application Priority Data

Oct. 17, 2019    (CN) .......................... 201910989905.9

(51) Int. Cl.
  *G06F 11/14*    (2006.01)
  *G06F 11/30*    (2006.01)
  *G06F 11/32*    (2006.01)

(52) U.S. Cl.
  CPC ...... *G06F 11/1461* (2013.01); *G06F 11/1451* (2013.01); *G06F 11/1464* (2013.01); *G06F 11/1469* (2013.01); *G06F 11/3006* (2013.01); *G06F 11/327* (2013.01)

(58) Field of Classification Search
  CPC ............. G06F 11/1461; G06F 11/1464; G06F 11/3006; G06F 11/1451; G06F 11/327; G06F 11/1469
  USPC ......................................................... 711/162
  See application file for complete search history.

(56) References Cited

U.S. PATENT DOCUMENTS

| | | | | |
|---|---|---|---|---|
| 2004/0205206 | A1* | 10/2004 | Naik | ...................... H04L 29/06 709/230 |
| 2013/0311923 | A1* | 11/2013 | Spivak | ................... G11B 27/36 715/771 |
| 2018/0067819 | A1* | 3/2018 | Kotha | ................. G06F 11/1461 |
| 2018/0316577 | A1* | 11/2018 | Freeman | ............. H04L 41/5009 |

* cited by examiner

*Primary Examiner* — Yair Leibovich
(74) *Attorney, Agent, or Firm* — Chamberlain, Hrdlicka, White, Williams & Aughtry

(57) ABSTRACT

Embodiments of the present disclosure relate to a data backup method, a data backup device, and a computer program product. The method comprises: receiving a request for backing up stored data; determining a backup requirement based on the request, the backup requirement comprising a requirement with respect to processing backup data of the stored data in a backup system; and determining a backup operation for processing the backup data based on the backup requirement.

16 Claims, 5 Drawing Sheets

DATA BACKUP METHOD, A DATA BACKUP DEVICE, AND A COMPUTER PROGRAM PRODUCT

CROSS-REFERENCE TO RELATED APPLICATIONS

This application claims benefit to Chinese Patent Application 201910989905.9 filed on Oct. 17, 2019. Chinese Patent Application 201910989905.9 is hereby incorporated by reference in its entirety.

FIELD

Embodiments of the present disclosure generally relate to the field of data protection, and more specifically to a data backup method, a data backup device, and a computer program product.

BACKGROUND

Data protection products protect a user's stored data mainly by means of backup, so that when the user's data is unavailable due to hardware or software problems, the user's stored data may be recovered through previously-generated backup data. In order to protect data through backup, the user needs to configure a backup policy. The backup policy corresponds to a backup operation. Upon configuring the backup policy, the user needs to consider the following issues that will be faced in the data protection lifecycle: what content needs to be protected (e.g., what data is to be backed up), when protection is performed (e.g., the data is backed up on which day during which time period), how long the specific protection will last (e.g., how long will the backup data remain in the backup system), how to achieve such protection (e.g., perform full backup or incremental backup, etc.), and where to place the backup copy. After the backup policy is configured, the data protection product generates, maintains and deletes the backup data in accordance with the backup policy.

With the further development of data protection products, users need to verify whether the backup protection of their data is compliant, that is, whether the backup data can meet the user's expected backup requirements (including whether the stored data within a specified time period can be recovered, whether the stored data can be recovered through multiple channels such as cloud, and so on). These backup requirements may be enterprise requirements of the enterprise as the user, or the industry requirements or policy requirements of the industry to which the user belongs. However, traditional data protection products require the users to configure the backup policies and backup requirements, respectively. Because ordinary users have difficulty in understanding the concept of backup requirements or because the configuration process is usually too complicated, the users might configure mismatched backup policies and backup requirements, so that the data cannot be backed up correctly. As a result, the users may not have a good user experience and there may be ineffective protection of user data.

SUMMARY

Embodiments of the present disclosure provide a data backup method, a data backup device, and a computer program product.

In a first aspect of the present disclosure, provided is a data backup method. The method comprises: receiving a request for backing up stored data; determining a backup requirement based on the request, the backup requirement comprising a requirement with respect to processing backup data of the stored data in a backup system; and determining a backup operation for processing the backup data based on the backup requirement.

In a second aspect of the present disclosure, provided is a data backup device. The device comprises: at least one processing unit; at least one memory, coupled to the at least one processing unit and storing instructions executed by the at least one processing unit, the instructions, when executed by the at least one processing unit, causing the device to perform acts, including: receiving a request for backing up stored data; determining a backup requirement based on the request, the backup requirement comprising a requirement with respect to processing backup data of the stored data in a backup system; and determining a backup operation for processing the backup data based on the backup requirement.

In a third aspect of the present disclosure, provided is a computer program product. The computer program product is tangibly stored on a non-transient computer readable medium and comprises machine executable instructions which, when being executed, cause a machine to perform any step of a method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the Background above, using the conventional data protection products, the users might have a good user experience and there may be ineffective protection of user data. A main reason thereof is that the user needs to configure the backup policy and backup requirement, respectively.

The backup requirements described above may be Service Level Agreements (SLAs) defined for data protection products based on Service Level Objectives (SLO). The Service Level Agreements usually include the following content: assets, Recovery Point Objective (RPO), compliance window, retention/expiration, 3-2-1 encryption, location, etc. All of these are all parameters may be applied to the data that is to be backed up.

Figure 1:
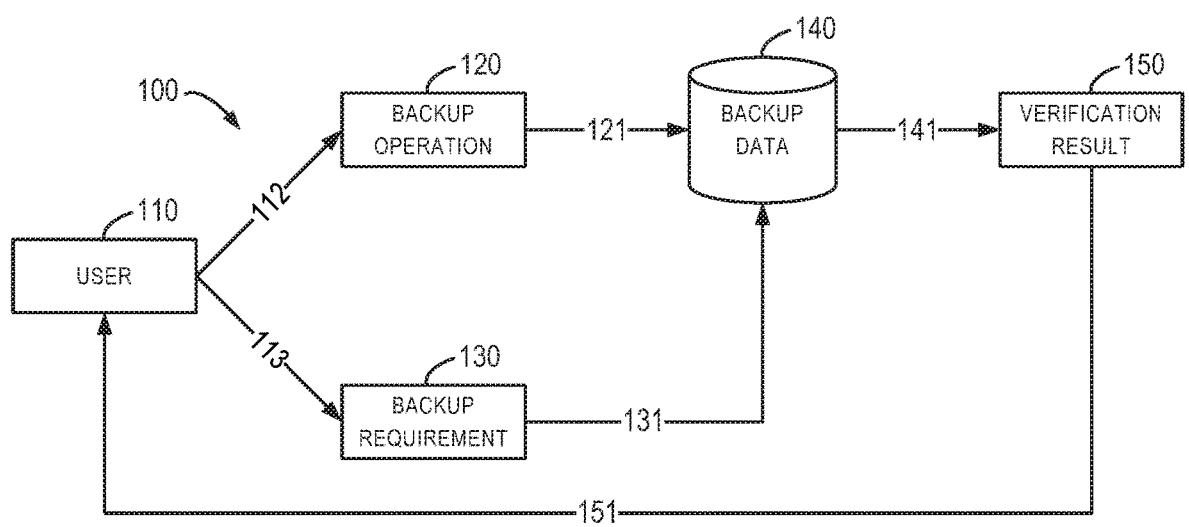
FIG. 1 shows a work flow chart 100 of a data backup method in a conventional solution.

FIG. 1 shows a work flow chart 100 of a data backup method in a conventional solution. As shown in FIG. 1, the data backup method in the conventional solution starts with the trigger of the user 110. The user 110 usually triggers the start of the data backup method in an input form. The arrows 112 and 113 shown in FIG. 1 indicate that the user 110 configures a backup operation 120 and a backup requirement 130 through input.

For example, configuring the backup operation 120 includes configuring: data backup is performed in units of hours, days, weeks or months, specifically, data backup is performed once at an interval of how many hours, days, weeks or months, and the start time and end time of data backup during the day. In another example, configuring the backup requirement 130 includes configuring: recovery point objective (i.e., the data of how long ago may be covered when data is recovered), compliance window (i.e., data backup is allowed at which time period), whether to verify that expired copies have been deleted, retention time objective (RTO, how long the backup data is retained), and whether to verify that retention locks are enabled for all copies, etc.

The arrow 121 shown in FIG. 1 indicates that after the backup operation 120 is configured, the backup data 140 is generated by performing the backup operation 120. The arrow 131 shown in FIG. 1 indicates that after the backup requirement 130 is configured, the backup requirement 130 is used to verify whether the generated backup data 140 is compliant, that is, whether the backup requirement 130 can be met. The arrow 141 shown in FIG. 1 indicates obtaining a verification result 150 by the verification indicated by the arrow 141. The arrow 151 shown in FIG. 1 indicates feeding back the verification result 150 to the user 110 after obtaining the verification result 150, wherein the verification result may indicate whether the verification passes or fails, and indicate a specific reason for failed verification when the verification fails, so that the user 110 may further reconfigure the backup operation 120 and the backup requirement 130 through input.

As stated above, for traditional data protection products, the configuration process is too complicated, and often result in incorrectly configured backup policies and ineffective protection of user data. The reasons why ordinary users have difficulty understanding the concept of backup requirements, may include, for example, the users lack common sense about compliance in the field of data protection, users have difficulty understanding the relationship between a backup operation and a service level agreement, the users have difficulty understanding why it is necessary to configure similar parameters twice for the backup operation and the service level agreement, etc. The reason why the configuration process is too complicated is that the users need to understand how to configure the backup operation, and there are often sophisticated user interfaces (UIs) for complex configurations. The reason why users configure mismatched backup policy and backup requirement is that in an enterprise, the users might configure conflicting backup policies and backup requirements because different individuals configure backup operations and backup requirements, respectively, and because the configuration process is too complicated.

In addition, when the backup policy does not meet the backup requirements (e.g., incompliant with the backup requirement), the users need to fully understand and master various backup policies and various backup requirements to make reasonable adjustments. For example, if the backup requirement requires a maximum of 50 backups for a user, but the number of actual backups generated exceeds 50, the user might not know how to adjust the backup policy to reduce the number of backups, because the backup requirement for example about the recovery point objective might be destroyed if the number of backups is reduced by purely reducing the frequency of generating backups.

The root cause for the above problems existing in the conventional data protection products is that the Data Protection Lifecycle (PLC) concept, e.g., implemented as the backup operation, might be mixed up with the Service Level Agreement (SLA), e.g., implemented as the backup requirement, and the user needs to configure both the backup policy and backup requirement and manually match them to avoid occurrence of conflicts.

In addition, traditional data protection products cannot achieve self-maintenance and adjustment after the backup operation is created and thus require a user with sufficient knowledge in the field to manually adjust the backup system.

In order to at least partially solve one or more of the above problems and other potential problems, embodiments of the present disclosure propose a method for applying compliance (backup requirement) driven data protection lifecycle in data protection products, that is, the user only needs to provide the backup requirement without specifying the backup policy (backup operation), and the system may automatically determine the backup policy, and then may optimize the backup policy or perform additional operations. In this way, it is possible to not only automatically generate the backup policy that can meet the user's backup requirements, but also simplify the configuration process and improve the user experience.

Figure 2:
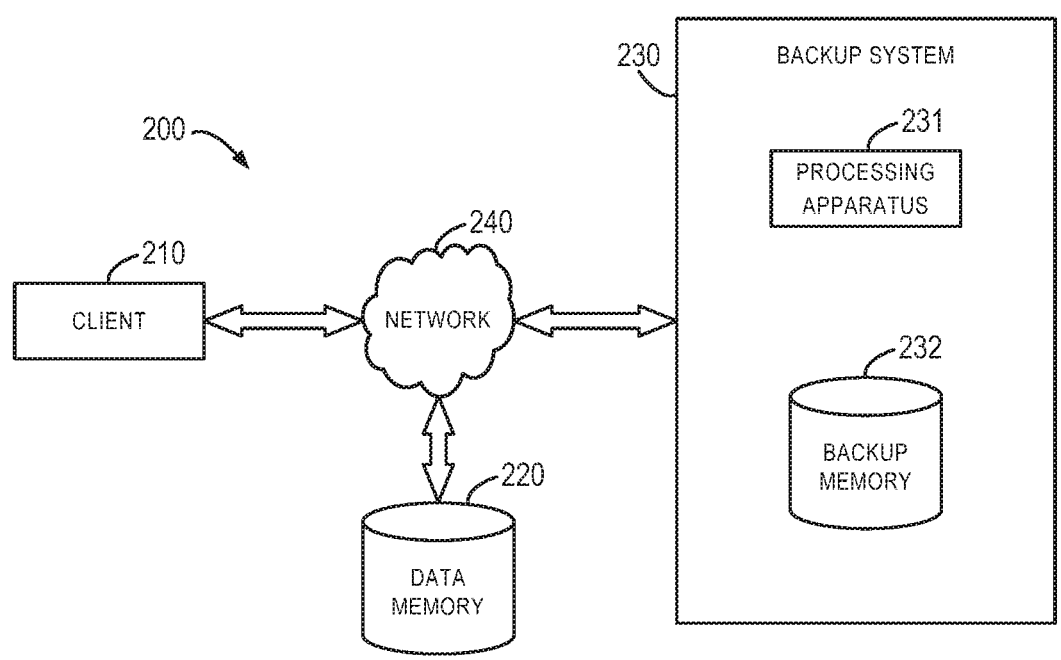
FIG. 2 shows a schematic diagram of a data backup environment 200 in which a data backup method in some embodiments of the present disclosure can be implemented.

FIG. 2 shows a schematic diagram of a data backup environment 200 in which a data backup method in some embodiments of the present disclosure can be implemented. The data backup environment 200 includes a client 210, a data memory 220, a backup system 230 and a network 240.

The backup system 230 includes a processing apparatus 231 and a backup memory 232. It should be noted that the data backup environment 200 is scalable and, as such, the environment may include more clients and data memories, and even may include more backup systems, and the backup system may also include more processing apparatuses and backups memories, thereby meeting the demand that more users may perform data backup simultaneously. For the sake of simplicity, FIG. 2 only shows one client 210, one data memory 220, one backup system 230 and one network 240, and the backup system 230 only includes one processing apparatus 231 and one backup memory 232.

In the data backup environment 200, the user uses the client 210 to manage the data stored in the data memory 220 through the network 240, and interacts with the backup system 230 through the network 240. The processing apparatus 231 in the backup system 230 is used to perform various operations associated with data backup, it obtains and backs up the data stored in the data memory 220 through the network 240, and stores the backup data in the backup memory 232.

As stated above, upon configuring the backup policy, the user needs to consider what content needs to be protected, when protection is performed, how long the specific protection will last, how to achieve such protection, where to place the backup copy, and so on. Meanwhile, the Service Level Agreements usually include the following content: assets, Recovery Point Objective (RPO), compliance window, retention/expiration, 3-2-1 encryption, location, etc. It may be seen that there is a corresponding relationship between the issues considered when configuring the backup policy and the content included in the service level agreement, that is, there is a corresponding relationship between the backup operation and the backup requirement. In addition, as stated above, it is irrational to let the user determine the backup operation to be performed for data backup on his own, but the backup requirement directly reflects the user's specific demands for data protection. Therefore, the backup requirement is used in the present disclosure to drive the entire data protection lifecycle.

Figure 3:
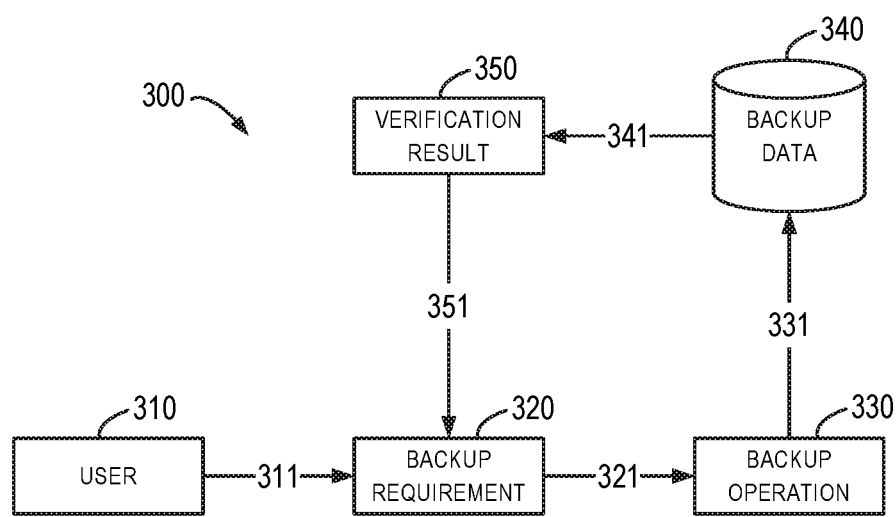
FIG. 3 shows a work flow chart 300 of a data backup method according to an embodiment of the present disclosure.

FIG. 3 shows a work flow chart 300 of a data backup method according to an embodiment of the present disclosure. The data backup method may be implemented in the data backup environment 200. As shown in FIG. 3, the data backup method according to an embodiment of the present disclosure starts with the trigger of the user 310. The user 310 uses the client 210 to trigger the backup system 230 to execute the data backup method in an input form.

The arrow 311 shown in FIG. 3 indicates that the user 310 configures the backup requirement 320 through input. The arrow 321 shown in FIG. 3 indicates that after the backup requirement 320 is configured, the backup system 230 automatically uses the backup requirement 320 to create a backup operation 330. The arrow 331 shown in FIG. 3 indicates that after the backup operation 330 is configured, the backup system 230 generates the backup data 340 by performing the backup operation 330. The arrow 341 shown in FIG. 3 indicates that after the backup requirement 320 is configured, the backup system 230 uses the backup requirement 320 to verify whether the generated backup data 340 is compliant, that is, whether the generated backup data 340 can meet the backup requirement 320. The arrow 341 shown in FIG. 3 indicates that the backup system 230 obtains a verification result 350 through the verification indicated by the arrow 341. The arrow 351 shown in FIG. 3 indicates that after the verification result 350 is obtained, the backup system 230 determines whether the backup requirement 320 is satisfied according to the verification result 350, and when the backup requirement is not satisfied, the backup system 230 may adjust the created backup operation 330 according to a specific reason for failure to pass the verification indicated in the verification result 350.

With the data backup method according to the embodiment of the present disclosure shown in FIG. 3 being employed, the configuration process that the user needs to perform may be greatly simplified, where the user 310 only needs to configure the service level agreement as the service level objective to directly meet his service level agreement requirement, and then the backup system 230 automatically generates a corresponding backup operation 330 to meet the service level agreement requirement. Therefore, the user interface provided by the backup system 230 to the user 310 and used to perform the configuration operation may also be greatly simplified.

According to an embodiment of the present disclosure, if the user 310 wants to be able to recover the stored data up to 6 hours ago when a disaster occurs, the user 310 only needs to set the recovery point objective service level objective in the backup system 230 to 6 hours. At this time, the user 310 only needs to click a button once to protect the assets (stored data) of the user 310 through this recovery point objective, and the backup system 230 may be completely set by this click of the button. The backup system 230 then performs the backup operation 330 that generates a copy of the stored data every 6 hours (or less) to ensure that backup data 340 within 6 hours is available for recovery at any time. The generated backup data 340 may then be verified to determine whether the set backup requirement 320 is satisfied, and the backup system 230 may use the verification result 350 to adjust the generated backup operation 330.

Figure 4:
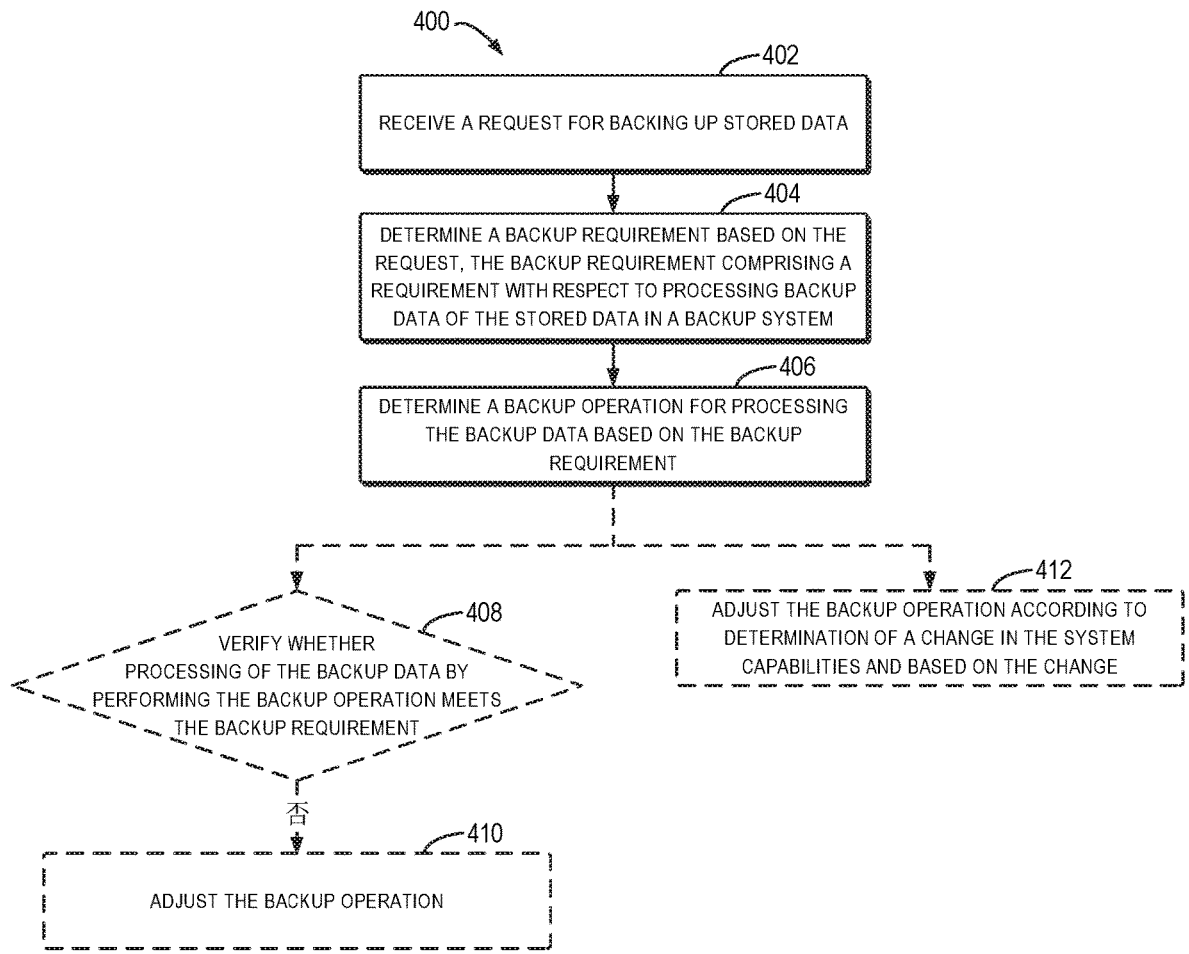
FIG. 4 shows a flow chart of a data backup method 400 according to an embodiment of the present disclosure.

FIG. 4 shows a flow chart of a data backup method 400 according to an embodiment of the present disclosure. The method 400 may be understood as a specific embodiment of the data backup method shown in FIG. 3. It should be understood that the method 400 does not completely correspond to the data backup method shown in FIG. 3, but is appropriately adjusted so as to bring more beneficial effects. Meanwhile, the method 400 may further include additional steps not shown and/or steps shown may be omitted, and the scope of the present disclosure is not limited in this regard.

At block 402, the backup system 230 receives a request to back up the stored data. According to an embodiment of the present disclosure, the backup system 230 may receive the request input by the user 310 from the client 210. In order to facilitate the user 310 to send a request that meets the requirement, the client 210 may support the user 310 to select pre-configured request content in the form of a pull-down menu, so that the user may file the request more easily. According to other embodiments of the present disclosure, the backup system 230 may obtain the requirement about the backup from the client 210 according to the client 210's property (for example, whether the client belongs to a specific industry or is governed by a specific policy requirement).

At block 404, the backup system 230 determines the backup requirement 320 based on the request received at block 402. Specifically, the backup requirement 320 includes a requirement with respect to processing the backup data of the stored data in the backup system 230. According to embodiments of the present disclosure, the requirement with respect to processing the backup data of stored data may include assets, Recovery Point Objective (RPO), compliance window, retention/expiration, 3-2-1 encryption, a size of a space for storing the backup data (e.g., 500 G), a maximum number of backups accommodated (e.g., 500), a storage location of backup data, etc.

At block 406, the backup system 230 determines the backup operation 330 for processing the backup data based on the backup requirement 320. According to an embodiment of the present disclosure, the backup operation 330 mainly includes generating backup data or deleting the backup data according to a predetermined rule (for example, generation time, storage location, retention time, etc.).

According to an embodiment of the present disclosure, the backup system 230 may implement, in the form of parameters, the backup operation 330 for processing the backup data based on the backup requirement 320. For example, the backup system 230 may first collect various requirement parameters from the backup requirement 320, such as time, location, and the like. Then, the backup system 230 may map the requirement parameters to the operation parameters corresponding to the backup operation 330. For example, the compliance window in the requirement parameters is mapped to the backup window in the operation parameters, and the recovery point objective in the requirement parameters is mapped to a backup frequency in the operation parameter and the retention time objective in the requirement parameters is mapped to the retention time in the operation parameters. Finally, the backup system 230 may use the obtained operation parameters to create the backup operation 330 by calling a corresponding REST API.

According to an embodiment of the present disclosure, in order to enhance the user experience, the backup system 230 may determine a candidate backup operation set for processing the backup data based on the backup requirement 320, and then determine the backup operation 330 from the candidate backup operation set. For example, if the user 310 requires that the stored data a maximum of 6 hours ago can be recovered when a disaster occurs, the user 330's requirement may be implemented by performing backup once every 6 hours, 5 hours or 4 hours, wherein the more frequently the backup is performed, the better the user 330's requirement may be achieved, but the greater the pressure on the backup system 230 is. At the same time, since the use of stored data may be affected when performing data backup, performing backup more frequently might shorten the time that user uses the stored data.

According to an embodiment of the present disclosure, the backup system 230 may determine the backup operation 330 from the candidate backup operation set based on system capabilities (e.g., data processing capability and storage capability) of the backup system 230. When the backup system 230 may assume more backup tasks, the backup may be performed more frequently.

According to the embodiment of the present disclosure, when the user 310 sends a backup request through the client 210, he may also input backup preference information about the backup at the same time. For example, if he wants to be able to recover data of a more recent time or wants to spend less time in performing backup, the backup system 230 may determine the backup operation 330 from the candidate backup operation set based on both system capabilities and backup preference information.

According to an embodiment of the present disclosure, the backup system 230 may, after determining the candidate backup operation set for processing backup data, provide the candidate backup operation set to the user 310, and determine the backup operation 330 based on the candidate backup operation selected by the user 310 from the candidate backup operation set, namely, regard the candidate backup operation selected by the user 310 as the backup operation 330.

In some additional embodiments, the method 400 may further adjust the backup operation determined at block 406. Optionally, at block 408, the backup system 230 verifies whether processing of the backup data by performing the backup operation 330 meets the backup requirement 320. When the backup requirement 320 is met, no additional operations may be performed. When the backup requirement 320 is not met, the backup system 230 may adjust the backup operation 330 at block 410. According to an embodiment of the present disclosure, the backup system 230 may automatically adjust the backup operation 330 without the intervention of the user 310. According to other embodiments of the present disclosure, the backup system 230 may provide an indication that the processing meets the backup requirement 320 to the user 310 through the client 210, then receive from the user 310 an instruction of adjusting the backup operation 330 through the client 210, and adjust the backup operation 330 based on the instruction, thereby better implementing the user's preference.

In other additional embodiments, after the backup system 230 starts to officially perform the backup operation 330 in a cyclic manner, the backup system 230 still monitors the system capacities of the backup system 230. In these embodiments, the backup system 230 may adjust the backup operation 230 according to the determination of a change in the system capabilities and based on the change of the system capabilities at block 412, so that it is possible to provide the user 310 with better user experience when the system capabilities permit.

Reference is made above to FIG. 2 through FIG. 4 to describe the data backup environment 200 in which the data backup method in some embodiments of the present disclosure can be implemented, the work flow chart 300 of the data backup method according to an embodiment of the present disclosure, and the data backup method 400 according to an embodiment of the present disclosure. It should be understood that the above description is intended to better show the content disclosed in the present disclosure, and is not intended to limit the present disclosure in any way.

It should be understood the number of elements and the value a physical quantity in the above figures are merely examples and not limiting the protection scope of the present disclosure. The number and value may be set according to needs, without any impact on the normal implementation of embodiments of the present disclosure.

Through the above description with reference to FIGS. 2 to 4, the technical solutions according to the embodiments of the present disclosure have many advantages over the traditional solution. For example, with the technical solution of the present disclosure, the configuration process of various parameters in the backup system 230 and the configuration of the user interface may be greatly simplified, so that a simple configuration manner may be provided to the user 310 without requiring the user 310 to master a lot of knowledge in the field of backup. At the same time, with the technical solution, the possibility of automatically determining, improving and adjusting the backup operation 330 may be provided. In addition, with the technical solution, it is possible to support the backup system 230 to recommend a more preferred backup operation 330 to the user in consideration of its own system capabilities.

Figure 5:
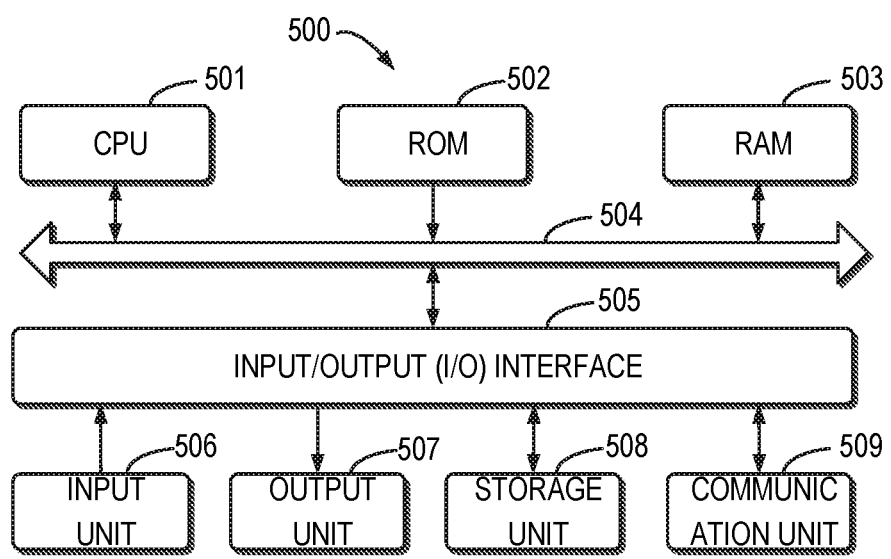
FIG. 5 shows a schematic block diagram of an example device 500 that may be used to implement embodiments of the present disclosure.

FIG. 5 shows a schematic block diagram of an example device 500 that may be used to implement embodiments of the present disclosure. As depicted, the device 500 comprises a central processing unit (CPU) 501 which is capable of performing various appropriate actions and processes in accordance with computer program instructions stored in a read only memory (ROM) 502 or computer program instructions loaded from a storage unit 508 to a random access memory (RAM) 503. In the RAM 503, there are also stored various programs and data required by the device 500 when operating. The CPU 501, the ROM 502 and the RAM 503 are connected to one another via a bus 504. An input/output (I/O) interface 505 is also connected to the bus 504.

Multiple components in the device 500 are connected to the I/O interface 505: an input unit 506 including a keyboard, a mouse, or the like; an output unit 507, such as various types of displays, a loudspeaker or the like; a storage unit 508, such as a disk, an optical disk or the like; and a communication unit 509, such as a LAN card, a modem, a wireless communication transceiver or the like. The communication unit 509 allows the device 500 to exchange information/data with other device via a computer network, such as the Internet, and/or various telecommunication networks.

The above-described procedures and processes (such as the method 400) may be executed by the processing unit 501. For example, in some embodiments, the method 500 may be implemented as a computer software program, which is tangibly embodied on a machine readable medium, e.g. the storage unit 508. In some embodiments, part or the entirety of the computer program may be loaded to and/or installed on the device 500 via the ROM 502 and/or the communication unit 509. The computer program, when loaded to the RAM 503 and executed by the CPU 501, may execute one or more acts of the method 400 as described above.

The present disclosure may be a method, a device, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A data backup method, comprising:
   receiving a request for backing up stored data;
   determining a backup requirement based on the request, the backup requirement comprising a requirement with respect to processing backup data of the stored data in a backup system;
   determining a backup operation for processing the backup data based on the backup requirement;
   processing the backup data in accordance with the backup operation, wherein processing the backup data comprises backing up the stored data;
   verifying whether processing of the backup data by performing the backup operation meets the backup requirement; and
   in response to the processing not meeting the backup requirement, adjusting the backup operation, wherein adjusting the backup operation comprises:
      providing a user with an indication that the processing fails to meet the backup requirement;
      receiving an instruction of adjusting the backup operation from the user based on the indication; and
      adjusting the backup operation based on the instruction.

2. The method according to claim 1, wherein determining the backup operation comprises:
   determining a candidate backup operation set for processing the backup data; and
   determining the backup operation from the candidate backup operation set based on system capabilities of the backup system.

3. The method according to claim 2, wherein determining the backup operation based on the system capabilities comprises:
   obtaining backup preference information from the backup requirement; and
   determining the backup operation based on the system capabilities and the backup preference information.

4. The method according to claim 2, further comprising:
   adjusting the backup operation according to a determination of a change in the system capabilities and based on the change.

5. The method according to claim 1, wherein determining the backup operation comprises:
   determining a candidate backup operation set for processing the backup data;
   providing a user with the candidate backup operation set; and
   determining the backup operation based on a candidate backup operation selected by the user from the candidate backup operation set.

6. The method according to claim 1, wherein the backup operation comprises at least one of the following:
   generating the backup data; and
   deleting the backup data.

7. A data backup device, comprising:
   at least one processing unit; and
   at least one memory, coupled to the at least one processing unit and storing instructions executed by the at least one processing unit, the instructions, when executed by the at least one processing unit, causing the device to perform a method, the method comprising:
      receiving a request for backing up stored data;
      determining a backup requirement based on the request, the backup requirement comprising a requirement with respect to processing backup data of the stored data in a backup system;
      determining a backup operation for processing the backup data based on the backup requirement;
      processing the backup data in accordance with the backup operation, wherein processing the backup data comprises backing up the stored data;
      verifying whether processing of the backup data by performing the backup operation meets the backup requirement; and
      in response to the processing not meeting the backup requirement, adjusting the backup operation, wherein adjusting the backup operation comprises:
         providing a user with an indication that the processing fails to meet the backup requirement;
         receiving an instruction of adjusting the backup operation from the user based on the indication; and
         adjusting the backup operation based on the instruction.

8. The device according to claim 7, wherein determining the backup operation comprises:
   determining a candidate backup operation set for processing the backup data; and
   determining the backup operation from the candidate backup operation set based on system capabilities of the backup system.

9. The device according to claim 8, wherein determining the backup operation based on the system capabilities comprises:

obtaining backup preference information from the backup requirement; and determining the backup operation based on the system capabilities and the backup preference information.

10. The device according to claim 8, wherein the method further comprises:

adjusting the backup operation according to determination of a change in the system capabilities and based on the change.

11. The device according to claim 7, wherein determining the backup operation comprises:

determining a candidate backup operation set for processing the backup data;

providing a user with the candidate backup operation set; and determining the backup operation based on a candidate backup operation selected by the user from the candidate backup operation set.

12. The device according to claim 7, wherein the backup operation comprises at least one of the following:

generating the backup data; and deleting the backup data.

13. A non-transitory computer readable medium comprising computer readable program code, which when executed by a computer processor enables the computer processor to perform a method, the method comprising:

receiving a request for backing up stored data;

determining a backup requirement based on the request, the backup requirement comprising a requirement with respect to processing backup data of the stored data in a backup system;

determining a backup operation for processing the backup data based on the backup requirement;

processing the backup data in accordance with the backup operation, wherein processing the backup data comprises backing up the stored data;

verifying whether processing of the backup data by performing the backup operation meets the backup requirement; and in response to the processing not meeting the backup requirement, adjusting the backup operation, wherein adjusting the backup operation comprises:

providing a user with an indication that the processing fails to meet the backup requirement;

receiving an instruction of adjusting the backup operation from the user based on the indication; and adjusting the backup operation based on the instruction.

14. The non-transitory computer readable medium of claim 13, wherein determining the backup operation comprises:

determining a candidate backup operation set for processing the backup data; and determining the backup operation from the candidate backup operation set based on system capabilities of the backup system.

15. The non-transitory computer readable medium of claim 14, wherein determining the backup operation based on the system capabilities comprises:

obtaining backup preference information from the backup requirement; and determining the backup operation based on the system capabilities and the backup preference information.

16. The non-transitory computer readable medium of claim 13, wherein determining the backup operation comprises:

determining a candidate backup operation set for processing the backup data;

providing a user with the candidate backup operation set; and determining the backup operation based on a candidate backup operation selected by the user from the candidate backup operation set.

\* \* \* \* \*